(12) United States Patent
Kim et al.

(10) Patent No.: US 7,636,563 B2
(45) Date of Patent: Dec. 22, 2009

(54) PERFORMING IDLE MODE IN A WIRELESS ACCESS SYSTEM

(75) Inventors: Beom-Joon Kim, Seoul (KR); Ki-Seon Ryu, Seoul (KR); Yong-Ho Kim, Bucheon-si (KR); Yong-Won Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 556 days.

(21) Appl. No.: 11/241,471

(22) Filed: Sep. 30, 2005

(65) Prior Publication Data
US 2006/0089161 A1 Apr. 27, 2006

(30) Foreign Application Priority Data

| Dec. 28, 2004 | (KR) | 10-2004-0114498 |
| Jan. 6, 2005 | (KR) | 10-2005-0001254 |
| Feb. 28, 2005 | (KR) | 10-2005-0017039 |
| Mar. 5, 2005 | (KR) | 10-2005-0018457 |
| Jul. 13, 2005 | (KR) | 10-2005-0063229 |

(51) Int. Cl.
H04B 1/16 (2006.01)
(52) U.S. Cl. .............. 455/343.1; 455/343.2; 455/343.5; 455/458; 455/574
(58) Field of Classification Search .............. 455/343.1, 455/343.2, 343.4, 343.5, 68, 70, 458, 550.1, 455/572, 574
See application file for complete search history.

(56) References Cited

U.S. PATENT DOCUMENTS

| 5,884,175 | A | * | 3/1999 | Schiefer et al. ............. 455/436 |
| 6,058,289 | A | * | 5/2000 | Gardner et al. ............. 340/7.32 |
| 6,119,000 | A | * | 9/2000 | Stephenson et al. ....... 455/432.1 |
| 7,130,668 | B2 | * | 10/2006 | Chang et al. ................. 455/574 |
| 2003/0040313 | A1 | * | 2/2003 | Hogan et al. ................. 455/435 |
| 2004/0179492 | A1 | | 9/2004 | Zhang et al. |
| 2005/0059437 | A1 | * | 3/2005 | Son et al. ..................... 455/574 |
| 2006/0014550 | A1 | * | 1/2006 | Ryu et al. .................... 455/458 |
| 2007/0191031 | A1 | * | 8/2007 | Mohanty et al. ............. 455/458 |
| 2007/0293244 | A1 | * | 12/2007 | Lee et al. .................. 455/456.5 |
| 2007/0298725 | A1 | * | 12/2007 | Ryu ............................. 455/68 |
| 2008/0043656 | A1 | * | 2/2008 | Yoon et al. ................... 370/311 |
| 2008/0049674 | A1 | * | 2/2008 | Cha et al. .................... 370/331 |

FOREIGN PATENT DOCUMENTS

KR 102001-0008025 A 2/2001

OTHER PUBLICATIONS

Sangheon P. "Performance analysis of IP paging protocol in IEEE 802.11 Networks" - This paper appears in: Local Computer Networks, 2003, LCN '03. Proceedings, 28th Annual IEEE International Conference. Published in Issue: Nov. 3, 2003.

* cited by examiner

Primary Examiner—CongVan Tran
(74) Attorney, Agent, or Firm—Lee, Hong, Degerman, Kang & Waimey

(57) ABSTRACT

A method for controlling an idle mode in a mobile station comprises transmitting an idle mode request message to a serving base station to enter the idle mode. The method also comprises determining whether a skip threshold parameter has been exceeded, the skip threshold parameter associated with a number of paging intervals to pass before receiving a paging message with a mobile station identifier of the mobile station. The method also comprises transmitting a location update request to a base station if the skip threshold parameter has been exceeded, the location update request configured to update the location of the mobile terminal with respect to the base station.

26 Claims, 8 Drawing Sheets

––––––––– First paging group –––––––––
·················· Second paging group ··················
— — — Third paging group — — —
――――― Fourth paging group ―――――

US 7,636,563 B2

PERFORMING IDLE MODE IN A WIRELESS ACCESS SYSTEM

CROSS-REFERENCE TO RELATED APPLICATIONS

Pursuant to 35 U.S.C. § 119(a), this application claims the benefit of earlier filing date and right of priority to Korean Application No. 2004-078324, filed on Oct. 1, 2004, No. 10-2004-0114498, filed on Dec. 28, 2004, No. 10-2005-0001254, filed on Jan. 6, 2005, No. 10-2005-0017037, filed on Feb. 28, 2005, the contents of which are hereby incorporated by reference herein in their entirety.

FIELD OF THE INVENTION

The present invention relates generally to a wireless access system and, more particularly, to idle mode in a wireless access system.

BACKGROUND OF THE INVENTION

A wireless access system conventionally supports an idle mode to reduce power consumption by a mobile station (MS). In idle mode, the MS is not yet registered to a specific base station (BS) and also is not handed over from one BS to another BS in a paging zone. A paging zone is composed of a plurality of BS areas. The MS receives a predetermined paging message (e.g., MOB-PAG-ADV) to enable the MS to periodically recognize the presence or absence of downlink traffic destined for the MS. Such operation may reduce power consumption by the MS.

Idle mode operation is described below. In a paging zone is a plurality of BSs contained in a group, called a paging group. The BSs included in the same paging group have the same paging cycle (e.g., Paging_Cycle) and the same paging offset (e.g., Paging_Offset). The MS may request the BS to enter an idle mode. The BS transmits its paging group ID (e.g., Paging Group ID), a paging cycle corresponding to the paging group ID, and a paging offset to the MS to enable the MS to enter the idle mode. In such case, the MS and the BS operate a timer for updating position information related to the MS that entered the idle mode.

During the idle mode, the MS receives the paging advertisement message (e.g., MOB-PAG-ADV) configured as broadcast information from the BS at intervals of a predetermined paging time. The MS may determine whether to continuously maintain the idle mode, to terminate the idle mode, or to perform a location update procedure using the received paging advertisement message (e.g., MOB-PAG-ADV). If uplink traffic is to be transferred from the MS during the idle mode, the MS may terminate the idle mode.

If downlink traffic is to be received by the MS during idle mode, the BS may allow the MS to terminate the idle mode using the paging advertisement message (e.g., MOB-PAG-ADV). If the MS in the idle mode loses a synchronization point such that it does not receive the paging advertisement message (e.g., MOB-PAG-ADV) by a set time, the MS terminates the idle mode.

If the MS in the idle mode moves from a current paging group to another paging group, or if a timer for updating position information expires, invalid parameters are updated according to a network re-registration procedure such that a location update procedure is performed. In such case, the MS does not perform removable procedures according to management resource information managed by the BS so that the MS may perform the location update procedure.

SUMMARY OF THE INVENTION

Accordingly, the present invention is directed to performing idle mode in a wireless access system that substantially obviates one or more problems due to limitations and disadvantages of the related art.

An object of the present invention is to provide for reducing a length of a message that provides information indicating whether an idle mode is maintained. As such, the present invention may utilize downlink wireless resources more efficiently and may minimize power consumed when a mobile station in an idle mode processes such a message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling an idle mode in a mobile station comprises transmitting an idle mode request message to a serving base station to enter the idle mode. The method also comprises determining whether a skip threshold parameter has been exceeded, the skip threshold parameter associated with a number of paging intervals to pass before receiving a paging message with a mobile station identifier of the mobile station. The method also comprises transmitting a location update request to a base station if the skip threshold parameter has been exceeded, the location update request configured to update the location of the mobile terminal with respect to the base station.

The method may further comprise transmitting a skip threshold request parameter from the mobile station and receiving the skip threshold parameter in response to the transmitting of the skip threshold request parameter. The method may further comprise reinitializing the step of determining whether the skip threshold parameter has been exceeded in response to receiving the paging message with a mobile station identifier of the mobile station. The method may further comprise receiving a paging message without a mobile station identifier of the mobile station from at least one base station within a paging group when there is no downlink traffic for the mobile station. The method may further comprise receiving a paging message without the mobile station identifier of the mobile station from at least one base station within a paging group when there is no location update request.

The skip threshold parameter may comprise at least one of a MAC (Medium Access Control) address hash, an action code, and a TLV (type length value) parameter for a paging operation. The paging message with a mobile station identifier of the mobile station may be a paging advertisement message.

In another embodiment, a method for controlling an idle mode of a mobile station in a network comprises receiving an idle mode request message from the mobile station to enter the idle mode. The method also comprises receiving a skip threshold request parameter from the mobile station. The method also comprises transmitting a skip threshold parameter in response to the receiving of the skip threshold request parameter, the skip threshold parameter associated with a number of paging intervals to pass before the mobile station receives a paging message with a mobile station identifier of the mobile station. The method also comprises receiving a location update request from the mobile station if the skip threshold parameter is exceeded, the location update request configured to update the location of the mobile terminal.

The method may further comprise transmitting a paging message without a mobile station identifier of the mobile station to the mobile station when there is no downlink traffic for the mobile station and receiving the packet data from the base station, wherein at least two of retransmitted packet data are transmitted from different antennas of the base station. The retransmitted packet data are received with information element comprising a retransmission count associated with a number of retransmission made by the base station.

The method may further comprise transmitting a paging message without a mobile station identifier of the mobile station to the mobile station when there is no location update request received from the mobile station. The network may comprise at least one of a base station and a paging controller, the paging controller configured to control paging of base stations within a paging group.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

An exemplary message between base stations (BSs), e.g., a "Paging-Group-Action" message for constructing a paging zone is shown in the below Table 1. The Paging-Group-Action message may be transmitted to a target position between BSs by wire.

TABLE 1

| Field | Size | Notes |
|---|---|---|
| Paging-group-action Message Format( ){ | | |
| Message Type | 8-bits | |
| Sender BS-ID | 48-bits | Base station unique identifier(Same number as that broadcasted on the DL-MAP message) |
| Target BS-ID | 48-bits | Base station unique identifier(Same number as that broadcasted on the DL-MAP message) |
| Time Stamp | 32-bits | Number of milliseconds since midnight GMT (set to 0xffffffff on the DL-MAP message) |
| Action | 4-bits | 0 - Assign target BS to paging groups<br>1 - Remove target BS from paging groups<br>2 - Query (which paging groups target BS belongs to?)<br>3 - Information(Paging groups sender BS belongs to) |
| Num Record | 4-bits | Number of paging group-ID records |
| Field | Size | Notes |
| For(j=0; j<Num Record; j++){ | | |
| Paging-group-ID | 16-bits | Paging-group-ID |
| PAGING_CYCLE | 16-bits | Cycle in which the paging message in transmitted within the paging group |
| PAGING_OFFSET } | 8-bits | MS PAGING OFFSET parameter |
| Security field | TBD | A mean to authenticate this message |
| CRC field } | 2-bits | IEEE CRC-32 |

The Paging-Group-Action message may be used in various ways, such as those described below, according to a combination of action bits. In a first usage, the Paging-Group-Action message assigns a target BS to a specific paging group, which may be denoted by "Action=0". In a second usage, the Paging-Group-Action message removes the target BS from the specific paging group, which may be denoted by "Action=1". In a third usage, the Paging-Group-Action message queries which paging group includes the target BS, which may be denoted by "Action=2". In a fourth usage, the Paging-Group-Action message indicates which paging group includes a sender BS, which may be denoted by "Action=3".

Since a BS may be included in one or more paging zones, the Paging-Group-Action message may include information associated with a plurality of paging groups. BSs may therefore recognize a paging cycle and a paging offset for use in each paging zone using the Paging-Group-Action message. Furthermore, the BSs may be dynamically assigned to a paging group.

Figure 1:
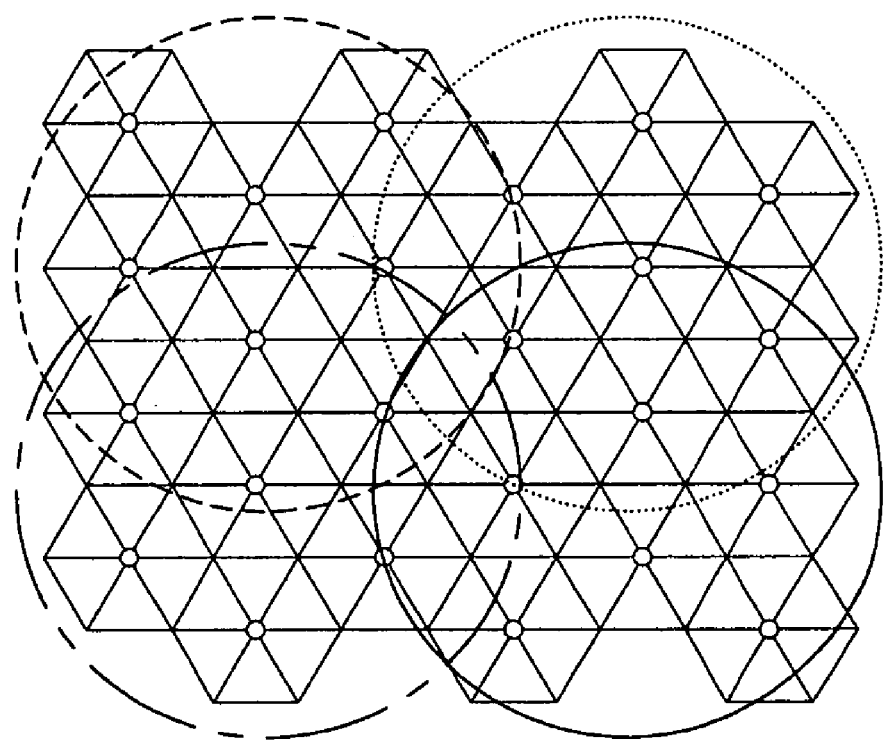
FIG. 1 is a diagram illustrating a paging group that includes a plurality of base stations, according to an embodiment of the present invention.

FIG. 1 is a diagram illustrating a paging group that includes a plurality of base stations, according to an embodiment of the present invention.

Referring to FIG. 1, a plurality of BSs supporting an idle mode are included in a paging group to configure a paging zone. An exemplary de-registration request (e.g., DREG-REQ) message used when the MS is switched to idle mode is shown in the below Table 2.

TABLE 2

| Syntax | Size | Notes |
|---|---|---|
| DREG-REQ_Message_Format( ){ | | |
| Management Message Type=29 | 8 bits | 0x00 = SS de-registration request from BS and network<br>0x01 = request for MS deregistration from Serving BS invitation of MS paging Availability Mode<br>0x02–0xFF = reserved |
| De-registration Request Code | 8 bits | Only valid if De-Registration Request Code = 0x01 |
| Paging Cycle Request | 16 bits | |
| TLV encoded parameter<br>} | Variable | |

The MS may set the de-registration request code of the above-mentioned DREG-REQ message to a predetermined value of 0x01, for example, and transmit the de-registration request code "0x01" to the BS to inform the BS that the MS will be switched to the idle mode. After the MS is switched to a desired paging cycle and a desired idle mode, the MS may transmit MS management resource information desired by the BS to the BS.

Exemplary TLV encoded parameters for the above-mentioned DREG-REQ message are shown in the below Table 3:

TABLE 3

| Name | Type | Length | Value |
|---|---|---|---|
| Paging Cycle Request | | 2 | Requested cycle in which the paging message is transmitted within the paging group. |
| Idle Mode Retain Information | | | MS request for Paging Controller retention of network re-entry related MAC management message MS service and operational information to expedite future Network Re-entry from Idle Mode. For each Bit location, a value of '0' indicates the information associated with the specified MAC management message is not requested to be retained to be retained and managed.<br>Bit#0: Retain MS service and operational information associated with SBC-REQ/RSP MAC management messages<br>Bit#1: Retain MS service and operational information associated with PKM-REQ/RSP MAC management messages<br>Bit#2: Retain MS service and operational information associated with REG-REQ/RSP MAC messages<br>Bit#3: Retain MS service and operational information associated with Network Address<br>Bit#4: Retain MS service and operational information associated with Time of Day Acquisition<br>Bit#5: Retain MS service and operational information associated with TFTP MAC management messages<br>Bit#6: Retain MS service and operational information with Full service (MAC state machines, CS classifier information, etc..) |

After receiving the DREG-REQ message from the MS, the BS may reply using a deregistration command (e.g., DREG-CMD) message.

An exemplary DREG-CMD message is shown in the below Table 4.

TABLE 4

| Syntax | Size | Notes |
|---|---|---|
| DREG-CMD_Message_Format( ){ | | |
| Management Message Type=29 | 8 bits | |
| Action Code | 8 bits | |
| TLV encoded parameters | variable | |
| } | | |

The BS may allow the MS to switch to the idle mode using an action code of the DREG-CMD message, which may be denoted by "Action Code=0x05". The BS may re-request the switching of the MS to the idle mode after the lapse of a predetermined time, which may be denoted by "Action Code=0x06". Alternatively, the BS may not request the switching of the MS to the idle mode until transmitting the DREG-CMD message, which may be denoted by "Action Code=0x07".

An exemplary action code of the DREG-CMD is shown in the below Table 5.

TABLE 5

| Action Code | Action |
|---|---|
| 0x00 | MS shall immediately terminate service with BS and attempt network entry at another BS |
| 0x01 | MS shall listen to the current BS but shall not transmit until an RES-CMD message or DREG-CMD with Action Code 0x00 is received |
| 0x02 | MS shall listen to the current BS but only transmit on the Basic, Primary Management and Secondary Management Connections. |
| 0x03 | MS shall return to normal operation and may transmit on any of its active connections. |
| 0x04 | MS shall terminate current Normal Operation with the BS; the BS shall transmit this action code only in response to any MS DREG-REQ |
| 0x05 | required MS de-registration from Serving BS and request initiation of MS Idle Mode |
| 0x06 | The MS may retransmit the DREG-REQ message after the time duration (REQ-duration) provided in the message |
| 0x07 | The MS shall not retransmit the DREG-REQ message and shall wait the DREG-CMD message |
| 0x08–0xFF | Reserved |

Using a TLV (Type Length Value) item selectively included in the DREG-CMD message, a paging group ID, a paging cycle (e.g., Paging_Cycle), and a paging offset (e.g., Paging_Offset) may be transmitted to the BS. The paging offset must be maintained by a corresponding MS during the idle mode.

Exemplary TLV parameters included in the DREG-CMD message are shown in the below Table 6.

TABLE 6

| Name | Type | Length | Value |
|---|---|---|---|
| Paging Information | | 4 | Bits 15:0 - PAGING_CYCLE - Cycle in which the paging message is transmitted within the paging group<br>Bits 23:16 - PAGING OFFSET - Determines the frame within the cycle in which the paging message is transmitted. Must be smaller than PAGING CYCLE value<br>Bits 31:24 - Paging-group-ID - ID of the paging group the MS is assigned to |
| REQ-duration | | 1 | Waiting value for the DREG-REQ message retransmission (measured in frames) |
| Paging Controller ID | | 6 | This is a logical network identifier for the Serving BS or other network entity retaining MS service and operational information and/or administering paging activity for the MS while in IDLE Mode |
| Idle Mode Retain Information | | 1 | Idle Mode Retain Information is provided as part of this message is indicative only. Network Re-entry from Idle Mode process requirements may change at time of actual reentry. For each Bit location, a value of '0' indicates the information for the associated reentry management messages shall not be retained and managed, a value of '1' indicates the information for the associated re-entry management message shall be retained and managed<br>Bit #0: Retain MS service and operational information associated with SBC-REQ/RSP MAC management messages<br>Bit #1: Retain MS services and operational information associated with PKM-REQ/RSP MAC management messages |

TABLE 6-continued

| Name | Type | Length | Value |
|------|------|--------|-------|
| | | | Bit #2: Retain MS service and operational information associated with REG-REQ/RSP MAC management messages |
| | | | Bit #3: Retain MS service and operational information associated with Network Address |
| | | | Bit #4: Retain MS service and operational information associated with Time of Day |
| | | | Bit #5: Retain MS service and operational information associated with TFTP MAC management messages |
| | | | Bit #6: Retain MS service and operational information associated with Full service (MAC state machines, CS classifier information, etc.) |

As shown in the above Table 6, the DREG-CMD message provides a TLV parameter. The DREG-CMD message includes paging information, MS management resource information maintained by the MS after the MS is switched to the idle mode, and a paging controller identifier (denoted by Paging Controller ID in Table 6). A procedure for acquiring information units maintained by the BS when the MS is switched to the idle mode may be removed from a network registration procedure based on an assumption that the MS in the idle mode terminates the idle mode or performs the location update procedure. As a result, the MS may be registered in the network and position information related to the MS may be updated with new position information.

An exemplary paging advertisement (e.g., MOB-PAG-ADV) message is shown in the below Table 7.

MOB-PAG-ADV message. In such case, a Medium Access Control (MAC) address hash including a predetermined length of 24 bits, for example, may be used as an identifier capable of identifying individual MSs. The idle-mode MSs may determine whether a paging group is changed to another paging group based on a paging group ID parameter setup value of the MOB-PAG-ADV message. The idle mode MSs may then find a corresponding BS ID (e.g., MAC address hash) from the MOB-PAG-ADV message, and determine whether the idle mode is being normally operated in the paging group.

If the idle-mode MS receives the MOB-PAG-ADV message and does not find a corresponding MS ID in the message, the MS may determine that a problem has occurred in idle mode operations and may terminate the idle mode.

TABLE 7

| Syntax | Size | Notes |
|--------|------|-------|
| MOB-PAG-ADV_Message_Format( ){ | | |
|   Management Message Type =62 | 8 bits | |
|   Num_Paging Group IDs | 8 bits | Number of Paging Group IDs in this message |
| For(i=0; i<Num_Paging_Group_IDs; i++){ | | |
|   Paging Group ID | 8 bits | |
| } | | |
| For(j=0; j<Num_MACs; j++){ | | Number of MS MAC Addresses in message may be determined from the length of the message(found in the generic |
| MS MAC Address hash | 24 bits | |
|   Action Code | 2 bits | Paging action instruction to MS<br>00=No Action Required<br>01=Performing Ranging to establish location and acknowledge message<br>10=Enter Network<br>11=reserved |
|   Reserved | 6 bits | |
| } | | |
| TLV Encoded Information | variable | TLV specific |
| reserved | variable | Padding bits to ensure octet aligned |
| } | | |

The MS receives the above-mentioned MOB-PAG-ADV message in a paging offset during a predetermined paging period and maintains or terminates idle mode, accordingly. The MS in the idle mode receives the paging advertisement message (e.g., MOB-PAG-ADV) periodically transmitted from the BS, such that it may determine whether to terminate the idle mode, to perform a location update procedure, or to maintain the idle mode.

BSs in a single paging group may command operations of idle-mode MSs included in the paging group using the same Although the corresponding MS may not perform a network registration procedure for a location update procedure or to receive downlink traffic, the BSs included in a paging group must include a corresponding MS ID (e.g., MAC address hash) in the MOB-PAG-ADV message, and transmit the MOB-PAG-ADV message including the MS ID.

As such, BSs capable of supporting the idle mode include IDs of idle-mode MSs belonging to the same paging group in the MOB-PAG-ADV message. The BSs also convert the MOB-PAG-ADV message including the MS ID to broadcast information. Furthermore, the BSs transmit the broadcast information to a target MS at intervals of a paging time. Therefore, as the number of MSs switched to the idle mode increases, the length of the MOB-PAG-ADV message, which must be periodically transmitted by BSs in a corresponding paging group, also increases in proportion to the increased number of MSs. Furthermore, a downlink band required to transmit the MOB-PAG-ADV message is increased, such that BSs may not be able to effectively use wireless resources. Additionally, in relation to the length of the MOB-PAG-ADV message, processing power required for the idle-mode MS to receive and/or decode the MOB-PAG-ADV message is proportionally increased.

Therefore, if a corresponding MS ID (e.g., MAC address hash) is deleted when the BS commands the MS to maintain the idle mode using the MOB-PAG-ADV message, the length of the MOB-PAG-ADV message may be reduced. Furthermore, in such case, power consumption of wireless resources may be reduced, and a corresponding MS may update availability of idle-mode operation.

Various preferred embodiments for removing paging parameters from the MOB-PAG-ADV message are described below. The paging parameters include an MS ID (e.g., MAC address hash), an action code associated with the MS ID, and a TLV parameter.

In accordance with a first preferred embodiment, a type of the MOB-PAG-ADV message is defined, and a paging parameter associated with the idle-mode MS is included or omitted according to the MOB-PAG-ADV message type. The paging parameter may be removed from the MOB-PAG-ADV message based on a condition that the MOB-PAG-ADV message commands all idle-mode Ms to maintain the idle mode.

In accordance with a second preferred embodiment, if the MS is switched to the idle mode, the BS may include a number of times that the paging parameter may be removed from the MOB-PAG-ADV message in the DREG-CMD message, and may transmit the DREG-CMD message to the MS.

In accordance with a third preferred embodiment, a method is provided for employing a specific flag to indicate that a paging parameter capable of maintaining the idle mode is removed from the MOB-PAG-ADV message. Paging parameters corresponding to some MSs may not be removed from the MOB-PAG-ADV message, while other paging parameters corresponding to MSs capable of generating a command required to maintain the idle mode may be removed from the MOB-PAG-ADV message, for example. A paging parameter associated with an MS capable of generating a command required to perform a location update process and a network registration procedure may be included in the MOB-PAG-ADV message.

In accordance with a fourth preferred embodiment, if an idle-mode MS does not receive its ID (e.g., MAC address hash) from the MOB-PAG-ADV message for a predetermined number of successive times, the idle-mode MS may perform a location update procedure to update availability of the idle-mode operation. In such case, when the MS is switched to the idle mode, the BS may transmit information to indicate of the predetermined number of successive times to the MS using the DREG-CMD message. BSs contained in the paging group may include a corresponding paging parameter in the MOB-PAG-ADV message within a predetermined time corresponding to the predetermined number of successive times to enable the MS to update the availability of the idle-mode operation without performing an additional location update procedure. The number of times that the MS ID may be removed from the MOB-PAG-ADV message may be managed and/or updated by the BS or a paging controller.

An exemplary MOB-PAG-ADV message described in the above first preferred embodiment is shown in the below Table 8.

TABLE 8

| Syntax | Size | Notes |
|---|---|---|
| MOB-PAG-ADV_Message_Format( ) { | | |
| Management Message Type=62 | 8 bits | |
| Num_Paging_Group_IDs | 8 bits | Number of Paging Group IDs in this message |
| For(i=0; i<Num_Paging_Group_IDs; i++) { | | |
| Paging Group ID | 8 bits | |
| } | | |
| Paging Type | 1 bit | 0: Normal type<br>1: Compressed type |
| If(Paging Type == 0) { | | |
| Num_MACs | 15 bits | |
| For (j=0; j<Num_MACs; j++) { | | |
| MS MAC Address hash | 24 bits | The hash is obtained by computing a CRC24 on the MS 48-bit MAC address. The polynomial for the calculation is 0x864CFB |
| Action Code | 2 bits | Paging action instruction to MS<br>00=No Action Required<br>01=Perform Ranging to establish location and acknowledge message<br>10=Enter Network<br>11=reserved |
| Reserved | 6 bits | |
| } | | |
| } | | |
| else { | | |
| Reserved | 7 bits | |
| } | | |
| TLV encoded Information | variable | TLV specific |

TABLE 8-continued

| Syntax | Size | Notes |
|---|---|---|
| Reserved<br>}<br>else {<br>Reserved<br>}<br>} | variable<br><br><br>7 bits | Padding bits to ensure octet aligned<br><br><br>Padding bits to ensure octet aligned |

Exemplary parameters in the DREG-CMD message according to the above second preferred embodiment are shown in the below Table 9.

TABLE 9

| Name | Type | Length | Value |
|---|---|---|---|
| Number of skipping MAC Address hash | | 1 | Number of skipping MS MAC address hash in the MOB-PAG-ADV message when the value of action code associated with the MS is 0 (No Action). The unit is the number of MOB-PAG-ADV transmission. |

As shown in the above Table 9, parameters indicative of the number of times of omission (omission times) of the MS ID may be included in the DREG-CMD message.

Exemplary parameters in the DREG-CMD message according to the above second preferred embodiment are shown in the below Table 10.

TABLE 10

| Name | Type | Length | Value |
|---|---|---|---|
| Interval including MAC Address hash | | 1 | Indicates per which number of MOB-PAG-ADV transmission the BS should include MS MAC address hash in the MOB-PAG-ADV message when the value of action code associated with the MS is 0 (No Action). |

As shown in the above Table 10, parameters indicative of an interval in which the MS ID is included in the MOB-PAG-ADV may be included in the DREG-CMD message.

In accordance with the above second preferred embodiment, the MOB-PAG-ADV message for periodically commanding operation of the idle-mode MS may include a conventional MOB-PAG-ADV message. However, if a corresponding MS must maintain the idle mode according to the number of removable times of the MS ID (e.g., the number of times that the MSS ID may be removed), which was transmitted by the DREG-CMD message to allow the MS to be switched to the idle mode, the BS may regularly remove an MS ID from the MOB-PAG-ADV message.

Furthermore, if the MS in the idle mode receives a command to maintain the idle mode during a paging cycle, the corresponding MS ID may be removed. Therefore, although the specific MS ID is not included in the MOB-PAG-ADV message, the MS may determine that idle-mode operation is functioning normally. Based on the number of removable times of the MS ID, the availability of the idle-mode operation may be updated using the MS ID periodically transmitted in the MOB-PAG-ADV message.

If the MS does not receive the MS ID from the MOB-PAG-ADV message during a predetermined time corresponding to the number of removable times of the MS ID due to different transmission synchronization points of the MOB-PAG-ADV message communicated between BSs, the MS may operate as follows. If the MS does not receive the MS ID from the MOB-PAG-ADV message although it repeatedly receives the MOB-PAG-ADV message for a predetermined number of times, the MS may determine that a problem has occurred in idle-mode operation. The MS may then perform a network registration procedure or a location update procedure. The above-mentioned predetermined number of times may be double that of the parameter setup value shown in the above Table 10, for example. Alternatively, the above-mentioned predetermined number of times may be determined to be another value acquired when a predetermined number of '1' is added to the parameter setup value shown in the above Table 9 and the added result is doubled.

An exemplary MOB-PAG-ADV message according to the above third preferred embodiment is shown in the below Table 11.

TABLE 11

| Syntax | Size | Notes |
|---|---|---|
| MOB-PAG-ADV_Message_Format( ){ | | |
| Management Message Type=62 | 8 bits | |
| Num_Paging_Group_IDs | 8 bits | Number of Paging Group IDs in this message |
| For (i=0; i<Num_Paging_Group_IDs; i++)<br>{ | | |
| Paging Group ID | 8 bits | |
| } | | |
| Omit MS MAC Address hash | 1 bit | 0: No omission of MS MAC Address hash<br>1: Omission of MS MAC Address hash which value of Action code is 0. |
| Num_MACs | 15 bits | Number of MS MAC addresses |
| For (j=0; j<Num_MACs; j++) { | | |
| MS MAC Address hash | 24 bits | The hash is obtained by computing a CRC24 on |

TABLE 11-continued

| Syntax | Size | Notes |
|---|---|---|
| | | the MS 48-bit MAC address. The polynomial for the calculation is 0x864CFB |
| Action Code | 2 bits | Paging action instruction to MS<br>00=No Action Required<br>01=Perform Ranging to establish location and acknowledge message<br>10=Enter Network<br>11=reserved |
| Reserved | 6 bits | |
| } | | |
| TLV Encoded Information | variable | TLV specific |
| Reserved | variable | Padding bits to ensure octet aligned |
| } | | |

According to the third preferred embodiment, flag information may indicate whether information associated with the MS required to maintain the idle mode is removed from the MOB-PAG-ADV message, such that the length of the MOB-PAG-ADV message may be reduced when there is an MS required to perform a location update procedure and a network registration procedure.

However, although the MS may maintain idle mode during transmission of a plurality of MOB-PAG-ADV messages in the above first and third preferred embodiments, the MOB-PAG-ADV message including IDs of all MSs (i.e., "Paging Type=0" in Table 8 of the first preferred embodiment or "Omit MS MAC address hash=0" in Table 11 of the third preferred embodiment), may be transmitted to the idle-mode MSs such that the MOB-PAG-ADV message controls the idle-mode MSs to update the availability of idle-mode operations.

An example of a parameter contained in the DREG-REQ message and the DREG-CMD message is shown in the below Table 12.

TABLE 12

| Name | Type | Length | Value |
|---|---|---|---|
| MAC Hash Skip Threshold | | 1 | Maximum number of skipping MS MAC address hash in the MOB-PAG-ADV message successively in case the MS shall maintain Idle Mode(i.e. Action code is 0, 'No Action Required'). The unit is the number of MOB-PAG-ADV transmission. |

As shown in the above Table 12, a parameter indicative of the maximum number of removable times that the paging parameter removed from the MOB-PAG-ADV message may be included in the DREG-REQ message and the DREG-CMD message is shown. The value shown in Table 12 may indicate the maximum number of successively removable times of a predetermined MS ID removed from the MOB-PAG-ADV message by the BS. If the MS receives the MOB-PAG-ADV message having no MS ID, the above-mentioned parameters shown in Table 12 may be used as a reference for the location update procedure.

According to the above fourth preferred embodiment, information related to the MS switched to the idle mode may be included in the DREG-REQ message shown in Table 12 in order to request the maximum number of successively removable times of an MS ID removed from the MOB-PAG-ADV message. In such case, the BS informs the MS switched to the idle mode of the maximum number of removable times of the MS ID removed from the MOB-PAG-ADV message using the DREG-CMD message, as also shown in Table 12. Furthermore, although the MS receives the DREG-REQ message including no parameter indicative of the maximum number of removable times of the MS ID from the BS, the BS may include the parameter (shown in Table 12) indicative of the maximum number of removable times of the MS ID in the DREG-CMD message, and may transmit the DREG-CMD message including the above-mentioned parameter to the MS. The above-mentioned parameter indicative of the maximum number of removable times of the MS ID may be controlled by the BS or the paging controller. BSs contained in the same paging group may successively remove a corresponding MS ID from the MOB-PAG-ADV message within a predetermined time corresponding to the determined value (i.e., the maximum number of transmission times of the MOB-PAG-ADV message having no MS ID), as shown in the above Table 12.

In other words, BSs in the same paging group may set to the same value the parameter (shown in Table 12) associated with the maximum number of transmission times of the MOB-PAG-ADV message having no paging parameter. When the BS transmits the MOB-PAG-ADV message, the BS must include the paging parameter associated with a corresponding MS one or more times before the determined value (i.e., the maximum number of transmission times of the MOB-PAG-ADV message having no paging parameter) shown in Table 12 is established. Furthermore, if the MS receives the MOB-PAG-ADV message including its own ID after being switched to the idle mode, the MS may update the availability of idle-mode operations without performing additional operations. If the MS successively receives the MOB-PAG-ADV message having no MS ID several times more than the predetermined number of times shown in Table 12, it may perform the location update procedure defined in the BS or the paging controller to update the availability of idle-mode operations.

The above-mentioned case in which the BS removes an ID of the MS in the idle mode from the MOB-PAG-ADV message may be available when an action code of a corresponding MS commands the MS to continuously maintain the idle mode denoted by "No Action".

Figure 2:
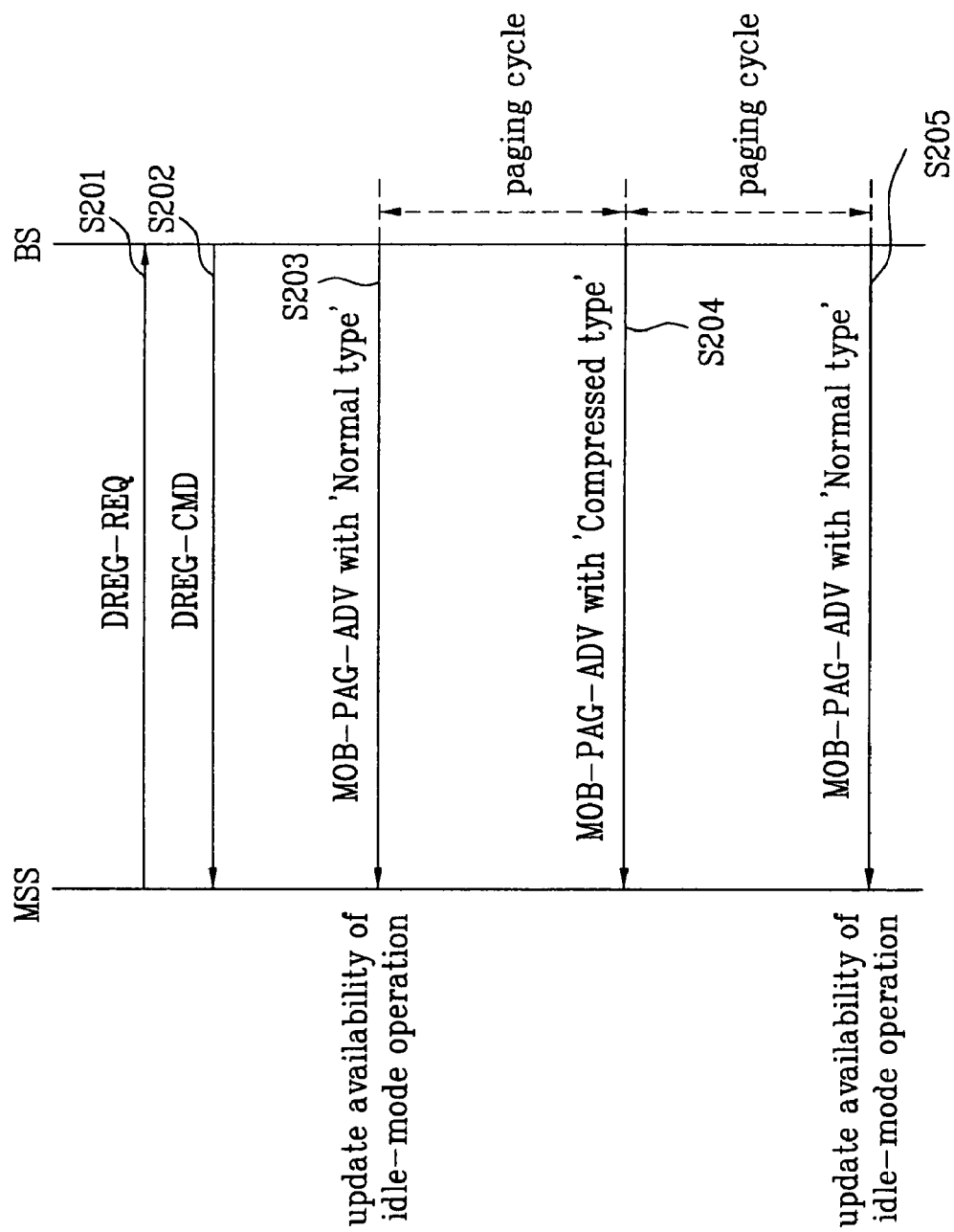
FIG. 2 is a flow diagram illustrating a method of performing idle mode, according to an embodiment of the present invention.

FIG. 2 is a flow diagram illustrating a method of performing idle mode, according to an embodiment of the present invention.

Referring to FIG. 2, the MS transmits a DREG-CMD message to the BS for switching to idle mode (S201). After receiving the DREG-CMD message from the MS, the BS permits the MS to be switched to the idle mode (S202).

The MS receives the MOB-PAG-ADV message from the BS at intervals of a predetermined paging cycle (S203). If the MOB-PAG-ADV message includes the MS ID (e.g., MAC address hash), that is, if the MOB-PAG-ADV message is determined to be a normal type including the MAC address hash of the MS, the MS performs an operation, such as an idle mode maintenance operation, a location update procedure, or a network registration operation, associated with an action code of the MOB-PAG-ADV message. In such case, the MS receives its own ID (e.g., MAC address hash) and determines whether the idle mode is being normally performed. If the MS receives its own ID via the MOB-PAG-ADV message, the MS performs a network registration procedure or a location update procedure, such that the MS may update the availability of idle-mode operations.

The MS receives the MOB-PAG-ADV message from the BS at intervals of a predetermined paging time (S204). If the MOB-PAG-ADV message does not include the MS ID (e.g., MAC address hash), that is, if the MOB-PAG-ADV message is determined to be a compressed type having no MAC address hash equal to the MS ID, the MS determines that the action code for commanding successive maintenance of the idle mode has been received. In such case, since the MS does not receive its own ID (e.g., MAC address hash), the availability of idle-mode operations is not updated.

Figure 3:
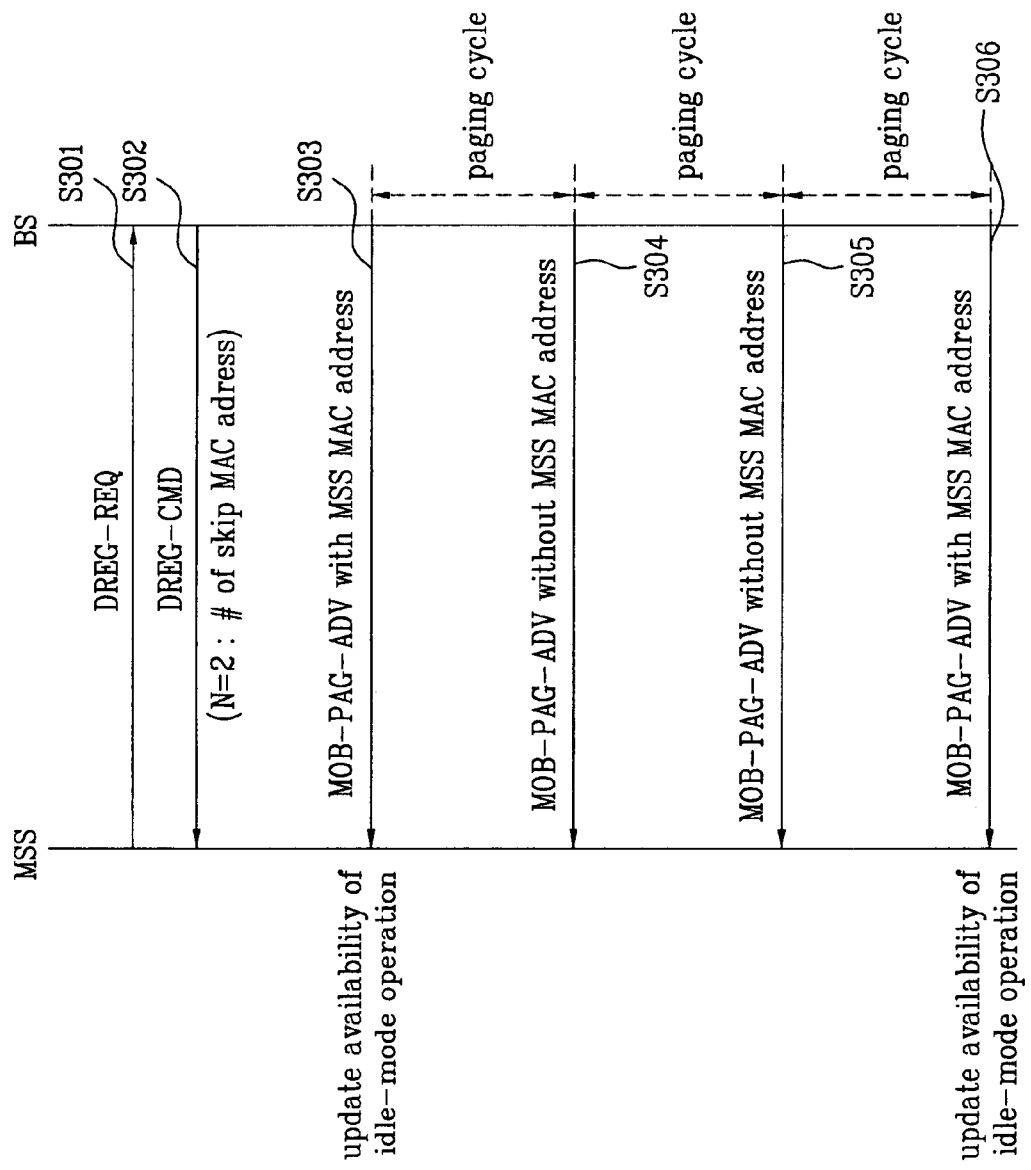
FIG. 3 is a flow diagram illustrating a method of performing idle mode, according to another embodiment of the present invention.

FIG. 3 is a flow diagram illustrating a method of performing idle mode, according to another embodiment of the present invention.

Referring to FIG. 3, the MS transmits a DREG-REG message to the BS for switching to idle mode (S301). After receiving the DREG-REQ message from the MS, the BS permits the MS to be switched to the idle mode (S302). In such case, the BS transmits specific information (e.g., a predetermined number of 2) indicative of a predetermined number of removable times related to an idle-mode ID commonly used in the paging group to the MS.

The MS receives the MOB-PAG-ADV message from the BS at intervals of a predetermined paging cycle (S303). After receiving the MOB-PAG-ADV message, the MS determines whether it is normally operated in the idle mode on the basis of its ID contained in the MOB-PAG-ADV message, such that the MS may update the availability of idle-mode operations accordingly.

The BS recognizes the number of removable times related to the ID of the specific MS, and determines whether the ID (e.g., MAC address hash) related to the specific MS required to maintain the idle mode is removed from the MOB-PAG-ADV message at intervals of a predetermined paging cycle. If the MS ID is removed from the MOB-PAG-ADV message, the number of removable times of the MS ID may be reduced by one.

The MS receives the MOB-PAG-ADV message from the BS at intervals of a predetermined paging cycle (S304). If the MS does not acquire its ID (e.g., MAC address hash) from the MOB-PAG-ADV message, the MS determines that the action code for commanding idle-mode maintenance has been received and maintains the idle mode. In such case, the MS determines whether a problem has occurred in the idle-mode operations on the basis of the number of removable times of the MS ID received from the BS when the MS is switched to the idle mode.

If the MS does not acquire its ID from the MOB-PAG-ADV message during a predetermined time that is longer than a specific time corresponding to the number of removable times of the MS ID, the MS performs a network registration procedure or a location update procedure in the BS, such that the availability of idle-mode operation is updated. During the above-mentioned predetermined time, the MS may determine the presence or absence of the availability of the idle mode operation. For example, the predetermined time may be determined to be a specific value acquired when a predetermined number of '1' is added to the number of removable times of the MS ID and the added result is doubled.

If the MS must maintain the idle mode and the number of removable times of an MS ID is higher than a predetermined number of 1, the BS removes the MS ID (e.g., MAC address hash) from the MOB-PAG-ADV message, and reduces the number of removable times of the MS ID by one. The MS receives the MOB-PAG-ADV message from the BS at intervals of a predetermined paging cycle (S305).

If the MS does not receive its ID (e.g., MAC address hash) from the MOB-PAG-ADV message, the MS determines that the action code for commanding idle-mode maintenance has been received, such that it successively maintains the idle mode. In such case, the MS determines whether a problem has occurred in the idle-mode operation on the basis of the number of removable times of the MS ID received from the BS when the MS is switched to the idle mode. If the MS does not acquire its ID from the MOB-PAG-ADV message during a predetermined time that is longer than a specific time corresponding to the number of removable times of the MS ID, the MS performs a network registration procedure or a location update procedure in the BS, such that the availability of idle-mode operation is updated. During the above-mentioned predetermined time, the MS may determine the presence or absence of the availability of the idle mode operation.

If the MS must maintain the idle mode and the number of removable times of an MS ID is zero, the BS includes the MS ID and an action code capable of commanding the idle mode maintenance in the MOB-PAG-ADV message, and then transmits the MOB-PAG-ADV message to the MS (S306). In such case, the BS updates the number of removable times of the MS ID. After receiving the MOB-PAG-ADV message, the MS determines whether the idle mode is being normally operated based on its own ID contained in the MOB-PAG-ADV message, such that the MS updates the availability of idle-mode operations.

The BS transmits the MOB-PAG-ADV message to the MS, such that it commands the MS to perform a ranging process required for the MS location update procedure and the availability update procedure. If the MS performs the ranging process After receiving the command for the ranging process from the BS, the BS and the MS may update the number of removable times of the MS ID.

Figure 4:
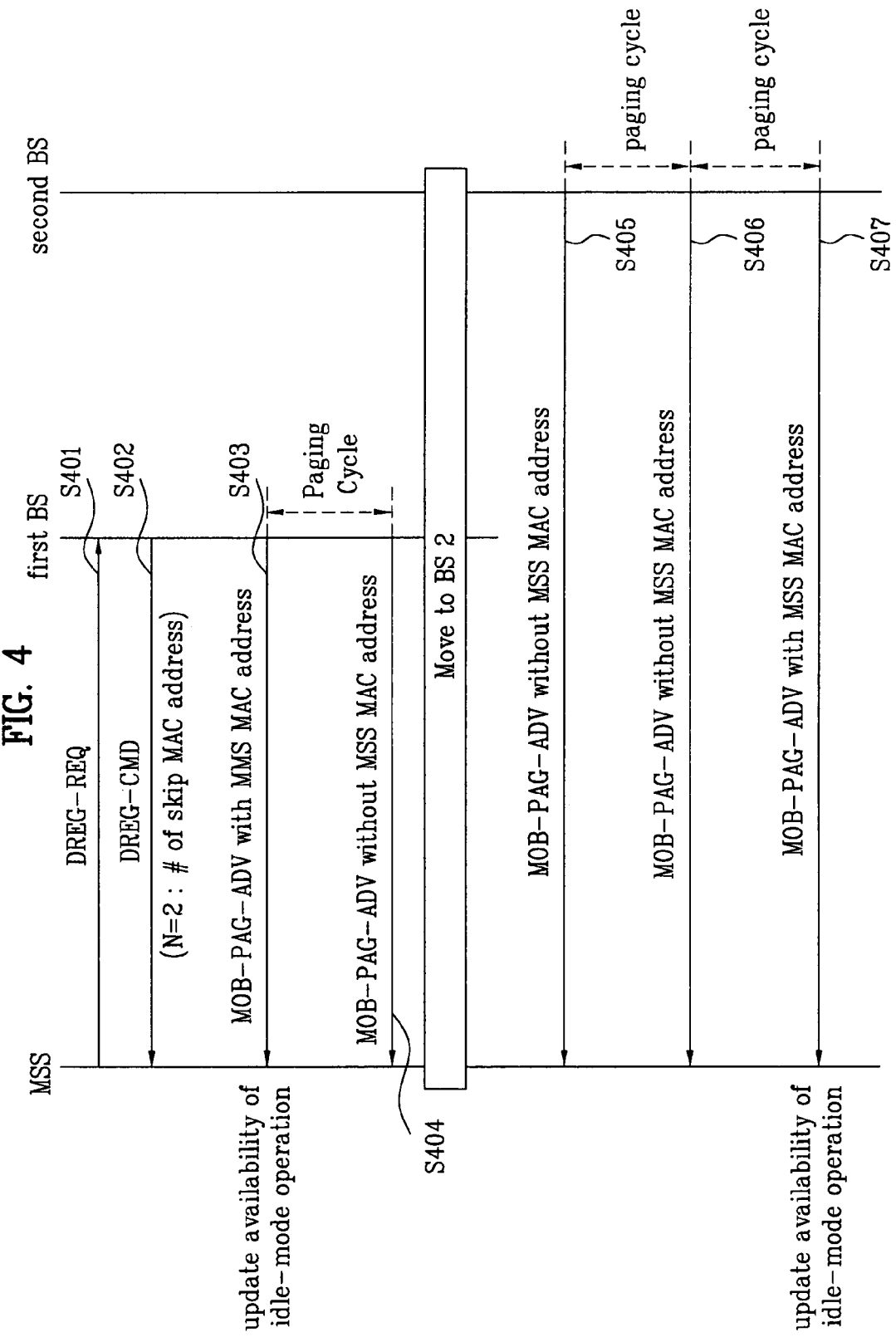
FIG. 4 is a detailed flow diagram illustrating the method of FIG. 3, according to an embodiment of the present invention.

FIG. 4 is a detailed flow diagram illustrating the method of FIG. 3, according to an embodiment of the present invention.

Referring to FIG. 4, the figure shows operations generated when the MS does not receive its own ID from the MOB-PAG-ADV message until the number of omission times of the MS ID reaches the maximum number of removable times of the MS ID because the MS moves from one BS area to another BS area.

Referring again to FIG. 4, the MS transmits the DREG-REG message to a first BS for switching to idle mode (S401). After receiving the DREG-REQ message from the MS, the first BS permits the MS to be switched to the idle mode (S402). In such case, the first BS transmits specific information (e.g., a predetermined number of 2) indicative of the number of removable times of an idle-mode ID commonly used in the paging group to the MS.

The MS receives the MOB-PAG-ADV message from the first BS at intervals of a predetermined paging cycle (S403). The MS determines whether the idle mode is being normally operated based on its ID contained in the MOB-PAG-ADV message, such that the availability of idle-mode operations is updated.

The MS receives the MOB-PAG-ADV message from the first BS at intervals of a predetermined paging cycle (S404). If the MS does not acquire its ID (e.g., MAC address hash) from the MOB-PAG-ADV message, the MS determines that the action code for commanding idle-mode maintenance has been received and successively maintains the idle mode.

If the MS moves from the first BS to the second BS, the MS may acquire a downlink frame synchronous signal associated with the second BS and receive the MOB-PAG-ADV message according to a paging cycle and a paging offset (S405). If the MS does not receive its ID (e.g., MAC address hash) from the MOB-PAG-ADV message, the MS determines that the action code for commanding idle-mode maintenance has been received and maintains the idle mode.

If the MOB-PAG-ADV message communicated between BSs has different transmission synchronization points, the BSs may have different time points at which the number of removable times of the MS ID is updated (S406). Therefore, although a time point at which the MS ID must be included in the MOB-PAG-ADV message is established, the MS ID may not be included in the MOB-PAG-ADV message because the MS moves from one BS to another BS.

In such case, the MS determines whether a current time reaches a specific time at which the MS may determine the absence of the idle-mode operation availability. The above-mentioned specific time is determined to be a predetermined value acquired when a predetermined number of I is added to the number of removable times of the MS ID and the added result is doubled. If the specific time at which the absence of the idle-mode operation availability is determined is not established, the MS determines that the action code for commanding idle-mode maintenance has been received, such that the MS successively maintains the idle mode. If the MS does not acquire its ID from the MOB-PAG-ADV message during a predetermined time during which the absence of the idle-mode operation availability may be determined, it performs a network registration procedure or a location update procedure in the BS, such that the MS updates the availability of idle-mode operation.

If the MS must maintain the idle mode and the number of removable times of the MS ID is zero, a second BS includes its ID and an action code capable of commanding the idle mode maintenance in the MOB-PAG-ADV message. The second BS then transmits the MOB-PAG-ADV message to the MS (S407). In such case, the BS updates the number of removable times of the MS ID. The MS determines whether the idle mode is being normally operated based on its ID contained in the MOB-PAG-ADV message, such that the MS updates the availability of idle-mode operations.

The above third preferred embodiment is provided to remove an ID of an MS capable of maintaining the idle mode from the MOB-PAG-ADV message although the MOB-PAG-ADV message includes information related to the MS maintaining the idle mode and information related to another MS for commanding a location update procedure and a network registration procedure.

Figure 5:
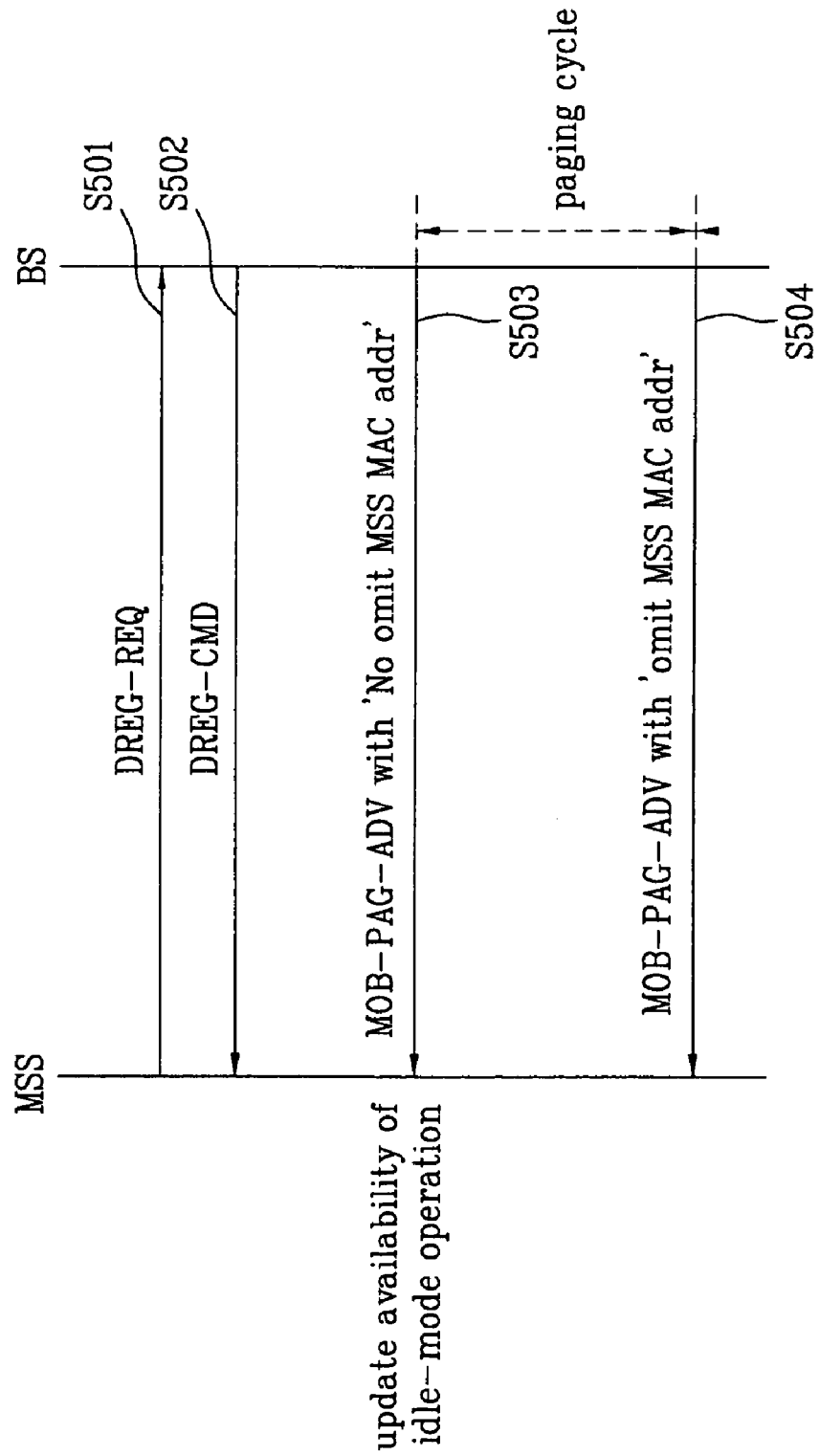
FIG. 5 is a flow diagram illustrating a method of performing idle mode, according to yet another embodiment of the present invention.

FIG. 5 is a flow diagram illustrating a method of performing idle mode, according to yet another embodiment of the present invention.

Referring to FIG. 5, the MS transmits the DREG-REG message to the BS for switching to idle mode (S501). After receiving the DREG-REQ message from the MS, the BS permits the MS to be switched to the idle mode (S502). The MS switched to the idle mode receives the MOB-PAG-ADV message from the BS at intervals of a predetermined paging cycle (S503).

In such case, if the MOB-PAG-ADV message includes all the MS IDs (e.g., MAC address hash), the MS maintains the idle mode according to an action code of the MOB-PAG-ADV message, performs a location update procedure, or performs a network registration procedure. Furthermore, the MS acquires its ID (e.g., MAC address hash) from the MOB-PAG-ADV message, such that it is determined whether the MS is normally operated in the idle mode. A specific flag contained in the MOB-PAG-ADV message may indicate whether the MOB-PAG-ADV includes all the MS IDs.

The MS receives the MOB-PAG-ADV message from the BS at intervals of a predetermined paging cycle (S504). If the MS receives specific information indicating that an ID of the MS required to maintain the idle mode is removed from the MOB-PAG-ADV message using the above-mentioned specific flag, the ID of the MS required to maintain the idle mode is not included in the MOB-PAG-ADV message, and the MS does not acquire its ID (e.g., MAC address hash) from the MOB-PAG-ADV message, the MS determines that the action code for commanding successive maintenance of the idle mode has been received. In such case, since the MS does not receive its ID (e.g., MAC address hash), the availability of idle-mode operations is not updated. If the MS does not acquire its ID from the MOB-PAG-ADV message including all MS IDs after receiving the MOB-PAG-ADV message, the MS performs a network registration procedure or a location update procedure in the BS, such that the MS may update the availability of idle-mode operations.

Figure 6:
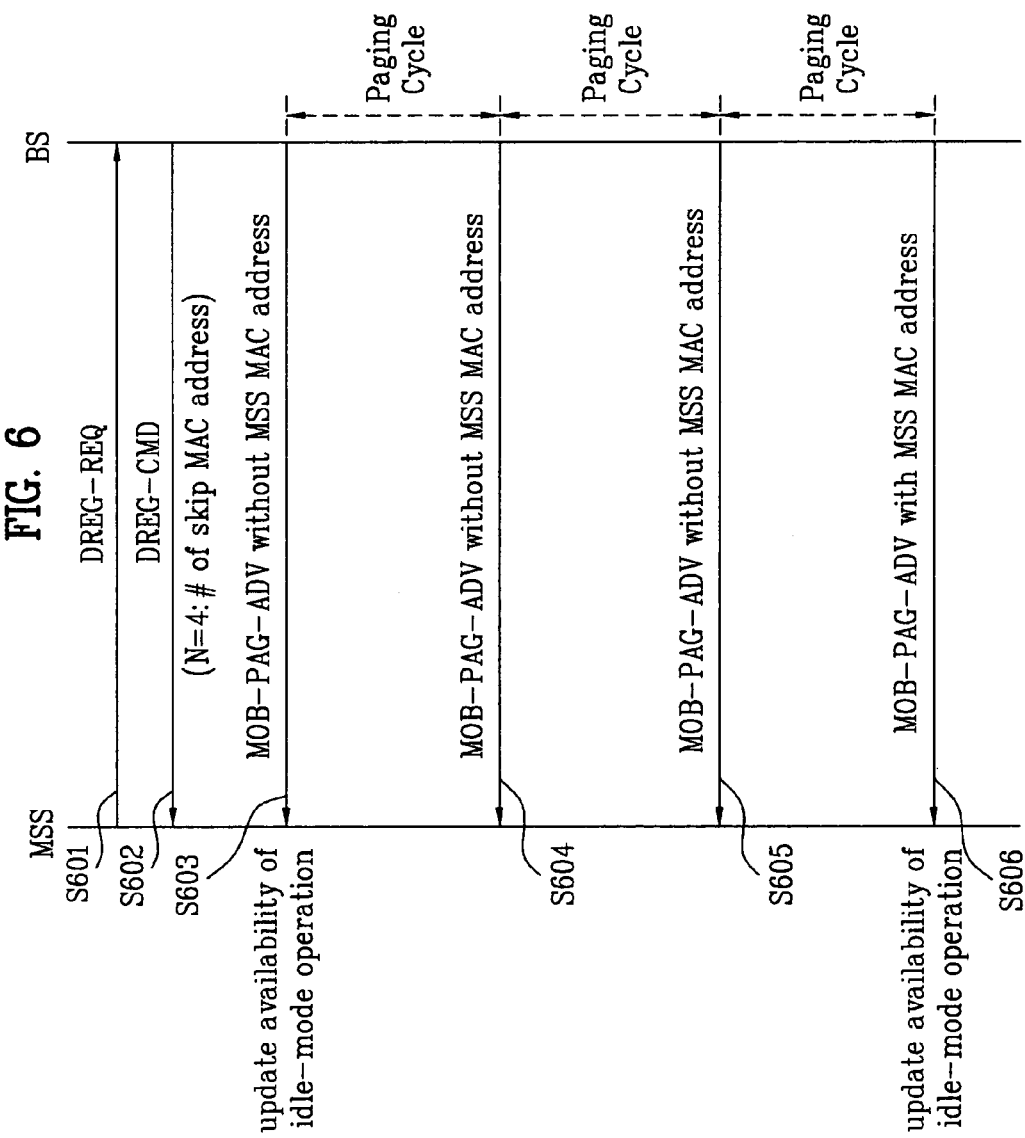
FIG. 6 is a first flow diagram illustrating a method for performing idle mode, according to still another embodiment of the present invention.

FIG. 6 is a first flow diagram illustrating a method for performing idle mode, according to still another embodiment of the present invention.

Referring to FIG. 6, the figure shows operations generated when the BS manages the maximum number of removable times of the MS ID. The MS transmits the DREG-REG message to the BS for switching to idle mode (S601). In such case, the maximum number of transmission times of the MOB-PAG-ADV message having no MS ID may be included in the DREG-REQ message, and the MS may transmit the DREG-REQ message to the BS (S601). After receiving the DREG-REQ message from the MS, the BS permits the MS to be switched to the idle mode (S602). In such case, the DREG-CMD message includes information (e.g., a predetermined number of 4) indicative of the maximum number of transmission times of the MOB-PAG-ADV message having no MS ID. Although the BS may receive the DREG-REQ message without a parameter to indicate of the maximum number of removable times of the MS ID, the BS may include a parameter indicative of the maximum number of transmission times of the MOB-PAG-ADV message having no MS ID in the DREG-CMD message. The parameter indicative of the maximum number of removable times of the MS ID may be managed by the BS or the paging controller in a single paging group. The maximum number of transmission times of the MOB-PAG-ADV message having no MS ID is commonly used in the paging group.

The MS receives the MOB-PAG-ADV message from the BS at intervals of a predetermined paging cycle (S603). After receiving the MOB-PAG-ADV message, the MS determines whether the idle mode is being normally operated based on its ID contained in the MOB-PAG-ADV message, such that the MS updates the availability of idle-mode operations.

The BS may recognize the maximum number of removable times of an ID of a specific MS, and may determine whether the ID (e.g., MAC address hash) of the specific MS required to maintain the idle mode is removed from the MOB-PAG-ADV message at intervals of a predetermined paging cycle.

The MS receives the MOB-PAG-ADV message from the BS at intervals of a predetermined paging cycle (S604). If the MS does not acquire its ID (e.g., MAC address hash) from the MOB-PAG-ADV message, the MS determines that the action code for commanding idle-mode maintenance has been received. In such case, the MS determines whether a problem has occurred in the idle-mode operations on the basis of the maximum number of removable times of the MS ID received from the BS when the MS is switched to the idle mode. If the number of reception times of the MS ID, which was not successively received from the MOB-PAG-ADV message, is equal to or less than the maximum number of removable times of the MS ID, the MS continuously maintains the idle mode.

If the MS must maintain the idle mode and an MS ID is successively removed from the MOB-PAG-ADV message within a predetermined time corresponding to the maximum number of removable times of the MS ID, the MS ID (e.g., MAC address hash) may be removed from the MOB-PAG-ADV message. The MS receives the MOB-PAG-ADV message from the BS at intervals of a predetermined paging cycle (S605).

If the MS does not receive its ID (e.g., MAC address hash) from the MOB-PAG-ADV message, the MS determines that the action code for commanding idle-mode maintenance has been received, such that the MS successively maintains the idle mode. In such case, the MS determines whether a problem has occurred in the idle-mode operation on the basis of the maximum number of removable times of the MS ID received from the BS when the MS is switched to the idle mode. If the number of successive reception times of the MS ID received from the MOB-PAG-ADV message is equal to or less than the maximum number of removable times of the MS ID, the MS continuously maintains the idle mode.

In association with the MS required to maintain the idle mode, the BS includes the MS ID and an action code capable of commanding the idle mode maintenance in the MOB-PAG-ADV message within a predetermined time corresponding to the maximum number of removable times of the MS ID, and transmits the MOB-PAG-ADV message including the MS ID and the action code (S606). In such case, the BS or the paging controller updates the maximum number of removable times of the MS ID. The MS determines whether the idle mode is being normally operated based on its own ID contained in the MOB-PAG-ADV message, such that the MS updates the availability of idle-mode operations.

The BS transmits the MOB-PAG-ADV message to the MS, such that it commands the MS to perform a ranging process required for the MS location update procedure and the availability update procedure. If the MS performs the ranging process After receiving the command for the ranging process from the BS, the BS and the MS may update the number of removable times of the MS ID.

Figure 7:
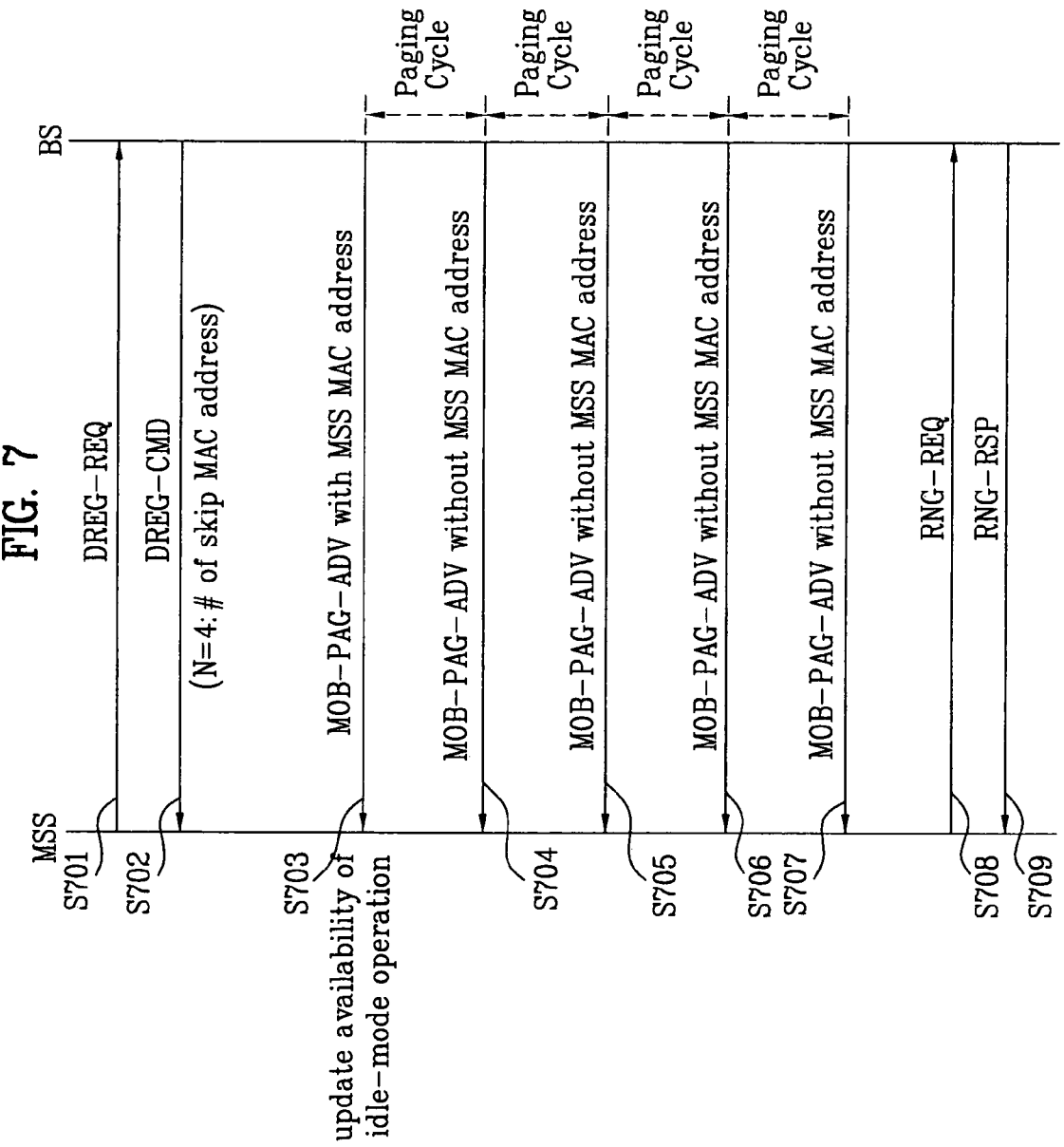
FIG. 7 is a second flow diagram illustrating the method of FIG. 6, according to an embodiment of the present invention.

FIG. 7 is a second flow diagram illustrating the method of FIG. 6, according to an embodiment of the present invention.

Referring to FIG. 7, the figure shows a variety of operations generated when the MS receives the MOB-PAG-ADV message without an MS ID, several times more than the maximum number of transmission times of the MOB-PAG-ADV message.

The MS transmits the DREG-REG message to the BS for switching to idle mode (S701). After receiving the DREG-REQ message from the MS, the BS permits the MS to be switched to the idle mode (S702). In such case, the BS transmits specific information (e.g., a predetermined number of 4) indicative of the number of removable times of an idle-mode ID commonly used in the paging group to the MS.

The MS receives the MOB-PAG-ADV message from the BS at intervals of a predetermined paging cycle (S703). The MS determines whether it is normally operated in the idle mode on the basis of its ID contained in the MOB-PAG-ADV message, such that the MS updates the availability of idle-mode operations.

The MS receives the MOB-PAG-ADV message from the BS at intervals of a predetermined paging cycle at steps S704-S706. If the MS does not receive its ID (e.g., MAC address hash) from the MOB-PAG-ADV message, the MS determines that the action code for commanding idle-mode maintenance has been received. In such case, the MS determines whether a problem has occurred in the idle-mode operations on the basis of the maximum number of removable times of the MS ID received from the BS when the MS is switched to the idle mode. If the number of reception times of the MS ID which was not successively received from the MOB-PAG-ADV message, is equal to or less than the maximum number of removable times of the MS ID, the MS continuously maintains the idle mode.

The MS receives the MOB-PAG-ADV message from the BS at intervals of a predetermined paging cycle (S707). If the MS does not receive its ID (e.g., MAC address hash) from the MOB-PAG-ADV message at least a predetermined number of times, the MS compares the predetermined number of reception times of the MS ID with the maximum number of removable times of the MS ID. If the MS does not successively receive the MS ID from the MOB-PAG-ADV message at least the maximum number of removable times of the MS ID, it may determine that there is no availability in the idle mode operation. In such case, the MS performs a location update procedure in the BS or the paging controller, such that the MS may update the availability of idle-mode operations. The MS transmits a ranging request to the BS to perform a location update procedure (S708). After receiving the ranging request from the MS, the BS updates position information related to the MS, and transmits a ranging response to the MS, such that the MS updates the availability of idle-mode operations (S709).

Figure 8:
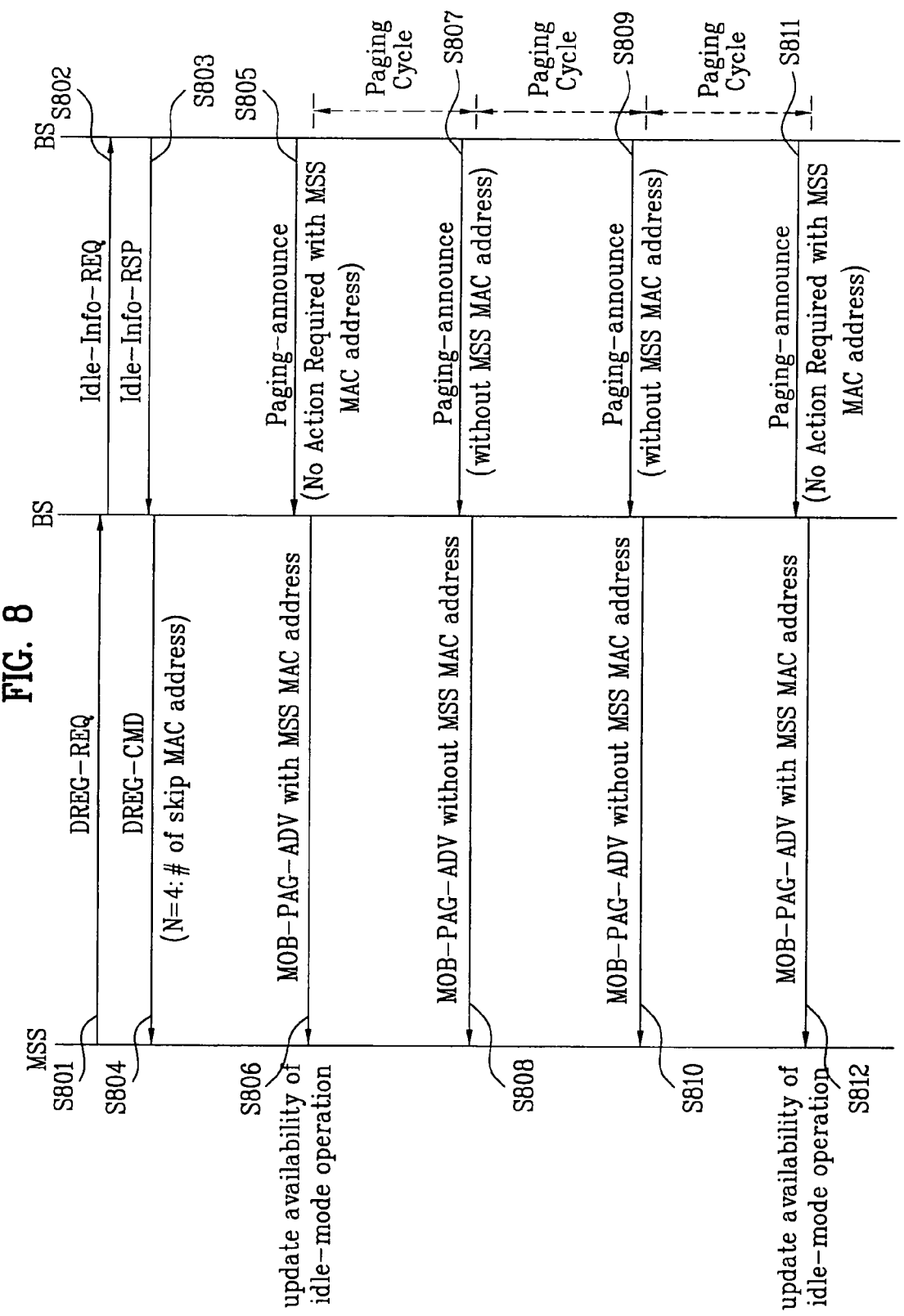
FIG. 8 is a third flow diagram illustrating the method of FIG. 6, according to an embodiment of the present invention.

FIG. 8 is a third flow diagram illustrating the method of FIG. 6, according to an embodiment of the present invention.

Referring to FIG. 8 shows a variety of operations generated when the maximum number of removable times of the MS ID is controlled by the paging controller. The MS transmits the DREG-REQ message to the BS for switching to idle mode. A parameter indicative of the maximum number (e.g., a parameter indicative of a MAC hash omission limitation value) of removable times of the MS ID may be included in the DREG-REQ message. The DREG-REQ message including the parameter is then transmitted to the BS (S801). The above-mentioned parameter indicative of the maximum number of removable times of the MS ID is shown in the above Table 12.

If the BS receives an idle mode switching request contained in the DREG-REQ message from the MS, the BS transmits an idle-mode information request (e.g., Idle-Info-REQ) message, shown in the below Table 13 to the paging controller to indicate a specific status in which the MS is switched to the idle mode.

An exemplary Idle-Info-REQ message is shown in the below Table 13.

TABLE 13

| Field | Size | Notes |
|---|---|---|
| Idle-Info-REQ message format( ){ | | |
| Global Message Header | 12 bits | |
| For(i=0;i<Num Records;i++){ | | |
| MS MAC Address | 48 bits | |
| Action Code | 4 bits | 0000: Idle Mode Initiation Request |
| | | 0001: DL Traffic has arrived to MS |
| | | 0010: MS session information |
| | | 0011: MS re-entry complete |
| | | 0100: MS has transitioned to another paging group |
| | | 0101: Location Update requested |
| | | 0101–1111: reserved |
| Reserved | 4 bits | |
| TLV encoded information | variable | |
| Security Field | TBD | A means to authenticate this message |
| } | | |

As shown in the above Table 13, the Idle-Info-REQ message includes a MAC address of an MS for transmitting a request to switch to the idle mode, and a MAC hash omission limitation TLV value (shown in Table 12) received from the MS.

After receiving the Idle-Info-REQ message, the paging controller transmits an Idle-Info-RSP message to the BS having transmitted the Idle-Info-REQ message (S803). An exemplary Idle-Info-RSP message is shown in the below Table 14.

TABLE 14

| Field | Size | Notes |
|---|---|---|
| Idle-Info-RSP message format( ) | | |
| Global Message Header | 152 bits | |
| For(i=0; i<Num Records;i++) | | |
| MS MAC Address | 48 bits | |
| Action Code | 4 bits | 0000: MS enters Idle Mode |
| | | 0001: MS exits Idle Mode |
| | | 0010: MS session information |
| | | 0011: Deliver DL Traffic to Current Attachment BS |
| | | 0100: Location Update Success |
| | | 0101: Location Update Failure |
| | | 0110–1111: reserved |
| Reserved | 4 bits | |
| TLV encoded information | Variable | |
| Security Field | TBD | A means to authenticate this message |
| } | | |

As shown in the above Table 14, the Idle-Info-RSP message includes a MAC address of a terminal switched to the idle mode, and a MAC hash omission limitation TLV value (shown in Table 12). Also, although the paging controller receives the Idle-Info-REQ message without a parameter indicative of the MAC hash omission limitation value, the parameter indicative of the MAC hash omission limitation value may be included in the Idle-Info-RSP message, such that the Idle-Info-RSP message may be transmitted to the BS. If the BS receives the Idle-Info-RSP message, the BS transmits the DREG-CMD message to the MS having transmitted the idle mode switching request, such that the MS is switched to the idle mode according to the DREG-CMD message at step S804. In such case, the DREG-CMD message includes information for commanding the MS to be switched to the idle mode, paging information TLV (e.g., a paging cycle, a paging offset, and a paging group ID), a paging controller ID TLV, an idle mode maintenance information TLV, and a MAC hash omission limitation TLV value.

The paging controller transmits a Paging-Announcement message to a BS that permitted the MS to be switched to the idle mode. The Paging-Announcement message is also transmitted to the other BSs in the same paging group as that of the BS (S805), such that the above-mentioned BSs are able to transmit the MOB-PAG-ADV message capable of commanding the MS to perform a specific operation during the next paging interval. In such case, in association with a specific MS required to maintain the idle mode according to the MAC hash omission limitation value, the paging controller informs the BS of specific information indicating whether the MAC hash address is contained in the MOB-PAG-ADV message transmitted from the BS to a plurality of MSs. In other words, the paging controller does not include a MAC address and an action code of a corresponding MS in the Paging-announcement message. The paging controller includes a MAC address and an action code "No action Required" of the corresponding MS in the Paging-Announcement message in order to include the MAC address of the MS in the MOB-PAG-ADV message, and transmits the Paging-Announcement message to BSs contained in the paging group. If the MAC address of the MAC is removed from the Paging-Announcement message, the paging controller subtracts a predetermined number of I from the MAC hash omission limitation value associated with the MS. Otherwise, if the MAC address of the MAC is included in the Paging-Announcement message, the paging controller updates or resets the MAC hash omission limitation value.

An exemplary Paging-Announcement message is shown in the below Table 15.

TABLE 15

| Field | Size | Notes |
|---|---|---|
| Paging-announce message format( ) | | |
| Global Message Header | 152 bits | |
| For(i=0;i<Num Records;i++){ | | |
| MS MAC Address | 48 bits | |
| Action Code | 4 bits | 0000: MS shall be paged to re-enter network |
| | | 0001: MS shall be paged to perform ranging |
| | | 0010: MS needs no action required |
| | | 0011–1111: reserved |
| Reserved | 4 bits | |
| } | | |
| Security Field | TBD | A means to authenticate this message |
| } | | |

If the BS receives the Paging-Announcement message from the paging controller, the BS transmits the MOB-PAG-ADV message to the MS at intervals of a predetermined paging cycle. If the MS receives its ID (e.g., MAC address hash) from the MOB-PAG-ADV message, it is determined that the MS is normally operated in the idle mode. Therefore, the MS updates the availability of idle-mode operations, and updates the MAC hash omission limitation value (S806).

The paging controller may remove the MAC address and action code of the MS from the Paging-Announcement message within a predetermined time during which the MAC hash omission imitation value does not reach a predetermined value of 0, and may transmit the resultant Paging-Announcement message to BSs (S807). In such case, the paging controller subtracts a predetermined number of 1 from the MAC hash omission limitation value associated with the MS having no MAC address.

If a current time reaches a predetermined paging time, the BS includes a MAC address and an action code of a corresponding MS, the MAC address and the action code of which have been included in the Paging-Announcement message received from the paging controller, in the MOB-PAG-ADV message. The BS configures the MOB-PAG-ADV message in the form of broadcast information, and then transmits the resultant MOB-PAG-ADV message. The MS receives the MOB-PAG-ADV message at intervals of a predetermined cycle. If the MAC address of the MS is not included in the MOB-PAG-ADV message, the MS determines that an action code for commanding idle mode maintenance has been received. In such case, the MS determines whether a problem has occurred in the idle-mode operations on the basis of the MAC hash omission limitation value received from the BS when the MS is switched to the idle mode. If the number of reception times of the MS ID, which was not successively received from the MOB-PAG-ADV message, is equal to or less than the MAC hash omission limitation value, the MS continuously maintains the idle mode (S808).

The paging controller may remove the MAC address and the action code of the MS from the Paging-Announcement message within a predetermined time corresponding to the MAC hash omission limitation value, and transmits the resultant Paging-Announcement message to the BS (S809).

After receiving the resultant Paging-Announcement message from the paging controller, the BS configures the MOB-PAG-ADV message, which was established by the Paging-Announcement message, in the form of broadcast information, and then transmits the resultant MOB-PAG-ADV message at intervals of a predetermined paging cycle. Also, if the number of reception times of the MS ID, which was not successively received from the MOB-PAG-ADV message, is equal to or less than the MAC hash omission limitation value, the MS continuously maintains the idle mode (S810).

The paging controller transmits the Paging-Announcement message, including the MAC address and the action code (e.g., denoted by "No Action Required") of the MS required to maintain the idle mode, to BSs, such that the MAC hash omission limitation value is updated. The paging controller initializes the MAC hash omission limitation value to a predetermined value (e.g., a predetermined number of 4) (S811).

The BS configures the MOB-PAG-ADV message established by the Paging-Announcement message in the form of broadcast information, and transmits the resultant MOB-PAG-ADV message at intervals of a predetermined paging cycle. If the MS receives its ID (e.g., MAC address hash) from the MOB-PAG-ADV message, it is determined that the MS is normally operated in the idle mode, such that the availability of idle-mode operations is updated, and the MAC hash omission limitation value is updated (S812).

If the MS does not successively receive its ID (e.g., MAC address hash) from the MOB-PAG-ADV message until reaching a predetermined time corresponding to the MAC hash omission limitation value, the MS determines that there is no availability in the idle-mode operations. In such case, the MS performs a location update procedure in the paging controller using a ranging process, such that it may update the availability of idle-mode operations. The MS transmits a ranging request message to the BS to perform the location update procedure. In such case, the MS includes a paging controller ID and an indicator parameter indicative of the location update procedure in the ranging request message. After receiving the ranging request message for the location update procedure from the MS, the BS transmits the Idle-Info-REQ message including a MAC address and location update action code of a corresponding MS to the paging controller. The paging controller performs the location update procedure for the corresponding MS, such that the availability of the MS and the MAC hash omission limitation value are updated. After performing the above-mentioned location update procedure, the paging controller informs the BS of the location update result using the Idle-Info-RSP message, and transmits a ranging response message to the MS, such that the availability of idle-mode operations of the MS is updated.

In one embodiment, a method for controlling an idle mode in a mobile station comprises transmitting an idle mode request message to a serving base station to enter the idle mode. The method also comprises determining whether a skip threshold parameter has been exceeded, the skip threshold parameter associated with a number of paging intervals to pass before receiving a paging message with a mobile station identifier of the mobile station. The method also comprises transmitting a location update request to a base station if the skip threshold parameter has been exceeded, the location update request configured to update the location of the mobile terminal with respect to the base station.

The method may further comprise transmitting a skip threshold request parameter from the mobile station and receiving the skip threshold parameter in response to the transmitting of the skip threshold request parameter. The method may further comprise reinitializing the step of determining whether the skip threshold parameter has been exceeded in response to receiving the paging message with a mobile station identifier of the mobile station. The method may further comprise receiving a paging message without a mobile station identifier of the mobile station from at least one base station within a paging group when there is no downlink traffic for the mobile station. The method may further comprise receiving a paging message without the mobile station identifier of the mobile station from at least one base station within a paging group when there is no location update request.

The skip threshold parameter may comprise at least one of a MAC (Medium Access Control) address hash, an action code, and a TLV (type length value) parameter for a paging operation. The paging message with a mobile station identifier of the mobile station may be a paging advertisement message.

In another embodiment, a method for controlling an idle mode of a mobile station in a network comprises receiving an idle mode request message from the mobile station to enter the idle mode. The method also comprises receiving a skip threshold request parameter from the mobile station. The method also comprises transmitting a skip threshold parameter in response to the receiving of the skip threshold request parameter, the skip threshold parameter associated with a number of paging intervals to pass before the mobile station receives a paging message with a mobile station identifier of the mobile station. The method also comprises receiving a location update request from the mobile station if the skip threshold parameter is exceeded, the location update request configured to update the location of the mobile terminal.

The method may further comprise transmitting a paging message without a mobile station identifier of the mobile station to the mobile station when there is no downlink traffic for the mobile station and receiving the packet data from the base station, wherein at least two of retransmitted packet data are transmitted from different antennas of the base station. The retransmitted packet data are received with information element comprising a retransmission count associated with a number of retransmission made by the base station.

The method may further comprise transmitting a paging message without a mobile station identifier of the mobile station to the mobile station when there is no location update request received from the mobile station. The network may comprise at least one of a base station and a paging controller, the paging controller configured to control paging of base stations within a paging group.

The present invention provides for performing an idle mode in a wireless access system to reduce the length of a message for providing information that indicates whether an idle mode is maintained. Downlink wireless resources may thus be more efficiently used, and power consumption by the idle mode MS that processes the message may be reduced.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for controlling an idle mode in a mobile station, the method comprising:
   transmitting an idle mode request message to a serving base station to enter the idle mode;
   determining whether a skip threshold parameter has been exceeded, the skip threshold parameter associated with a number of paging intervals to pass before receiving a paging message with a mobile station identifier of the mobile station; and
   transmitting a location update request to a base station if the skip threshold parameter has been exceeded, the location update request configured to update the location of the mobile terminal with respect to the base station.

2. The method of claim 1, further comprising:
   transmitting a skip threshold request parameter from the mobile station; and
   receiving the skip threshold parameter in response to the transmitting of the skip threshold request parameter.

3. The method of claim 1, further comprising reinitializing the step of determining whether the skip threshold parameter has been exceeded in response to receiving the paging message with a mobile station identifier of the mobile station.

4. The method of claim 1, further comprising receiving a paging message without a mobile station identifier of the mobile station from at least one base station within a paging group when there is no downlink traffic for the mobile station.

5. The method of claim 1, further comprising receiving a paging message without the mobile station identifier of the mobile station from at least one base station within a paging group when there is no location update request.

6. The method of claim 1, wherein the skip threshold parameter comprises at least one of a MAC (Medium Access Control) address hash, an action code, and a TLV (type length value) parameter for a paging operation.

7. The method of claim 1, wherein the paging message with a mobile station identifier of the mobile station is a paging advertisement message.

8. A method for controlling an idle mode of a mobile station in a network, the method comprising:
   receiving an idle mode request message from the mobile station to enter the idle mode;
   receiving a skip threshold request parameter from the mobile station;
   transmitting a skip threshold parameter in response to the receiving of the skip threshold request parameter, the skip threshold parameter associated with a number of paging intervals to pass before the mobile station receives a paging message with a mobile station identifier of the mobile station; and
   receiving a location update request from the mobile station if the skip threshold parameter is exceeded, the location update request configured to update the location of the mobile terminal.

9. The method of claim 8, further comprising:
   transmitting a paging message without a mobile station identifier of the mobile station to the mobile station when there is no downlink traffic for the mobile station; and
   receiving the packet data from the base station, wherein at least two of retransmitted packet data are transmitted from different antennas of the base station,
   wherein the retransmitted packet data are received with information element comprising a retransmission count associated with a number of retransmission made by the base station.

10. The method of claim 8, further comprising:
    transmitting a paging message without a mobile station identifier of the mobile station to the mobile station when there is no location update request received from the mobile station.

11. The method of claim 8, wherein the network comprises at least one of a base station and a paging controller, the paging controller configured to control paging of base stations within a paging group.

12. The method of claim 8, wherein the skip threshold parameter comprises at least one of a MAC (Medium Access Control) address hash, an action code, and a TLV (type length value) parameter for a paging operation.

13. The method of claim 8, wherein the paging message with a mobile station identifier of the mobile station is a paging advertisement message.

14. A mobile station for controlling an idle mode in a wireless access system, the mobile station comprising:
    means for transmitting an idle mode request message to a serving base station to enter the idle mode;
    means for determining whether a skip threshold parameter has been exceeded, the skip threshold parameter associated with a number of paging intervals to pass before receiving a paging message with a mobile station identifier of the mobile station; and
    means for transmitting a location update request to a base station if the skip threshold parameter has been exceeded, the location update request configured to update the location of the mobile terminal with respect to the base station.

15. The mobile station of claim 14, further comprising:
    means for transmitting a skip threshold request parameter from the mobile station; and
    means for receiving the skip threshold parameter in response to the transmitting of the skip threshold request parameter.

16. The mobile station of claim 14, further comprising means for reinitializing the means for determining whether the skip threshold parameter has been exceeded in response to receiving the paging message with a mobile station identifier of the mobile station.

17. The mobile station of claim 14, further comprising means for receiving a paging message without a mobile station identifier of the mobile station from at least one base station within a paging group when there is no downlink traffic for the mobile station.

18. The mobile station of claim 14, further comprising means for receiving a paging message without the mobile station identifier of the mobile station from at least one base station within a paging group when there is no location update request.

19. The mobile station of claim 14, wherein the skip threshold parameter comprises at least one of a MAC (Medium Access Control) address hash, an action code, and a TLV (type length value) parameter for a paging operation.

20. The mobile station of claim 14, wherein the paging message with a mobile station identifier of the mobile station is a paging advertisement message.

21. A network for controlling an idle mode in a wireless access system, the network comprising:
   means for receiving an idle mode request message from the mobile station to enter the idle mode;
   means for receiving a skip threshold request parameter from the mobile station;
   means for transmitting a skip threshold parameter in response to the receiving of the skip threshold request parameter, the skip threshold parameter associated with a number of paging intervals to pass before the mobile station receives a paging message with a mobile station identifier of the mobile station; and
   means for receiving a location update request from the mobile station if the skip threshold parameter is exceeded, the location update request configured to update the location of the mobile terminal.

22. The network of claim 21, further comprising:
   means for transmitting a paging message without a mobile station identifier of the mobile station to the mobile station when there is no downlink traffic for the mobile station; and
   means for receiving the packet data from the base station, wherein at least two of retransmitted packet data are transmitted from different antennas of the base station,
   wherein the retransmitted packet data are received with information element comprising a retransmission count associated with a number of retransmission made by the base station.

23. The network of claim 21, further comprising:
   means for transmitting a paging message without a mobile station identifier of the mobile station to the mobile station when there is no location update request received from the mobile station.

24. The network of claim 21, wherein the network comprises at least one of a base station and a paging controller, the paging controller configured to control paging of base stations within a paging group.

25. The network of claim 21, wherein the skip threshold parameter comprises at least one of a MAC (Medium Access Control) address hash, an action code, and a TLV (type length value) parameter for a paging operation.

26. The network of claim 21, wherein the paging message with a mobile station identifier of the mobile station is a paging advertisement message.

* * * * *